(12) United States Patent
Hu et al.

(10) Patent No.: US 11,708,179 B2
(45) Date of Patent: Jul. 25, 2023

(54) PARTITION SATELLITE MISSION PLANNING METHOD FOR EARLIEST COMPLETION OF REGIONAL TARGET COVERAGE

(71) Applicant: Hefei University of Technology, Anhui (CN)

(72) Inventors: Xiaoxuan Hu, Anhui (CN); Tianyang Gao, Anhui (CN); Yunhui Wang, Anhui (CN); Haiquan Sun, Anhui (CN); Huawei Ma, Anhui (CN); Guoqiang Wang, Anhui (CN); Yi Wu, Anhui (CN); Waiming Zhu, Anhui (CN)

(73) Assignee: Hefei University of Technology, Hefei (CN)

( * ) Notice: Subject to any disclaimer, the term of this patent is extended or adjusted under 35 U.S.C. 154(b) by 339 days.

(21) Appl. No.: 17/007,157

(22) Filed: Aug. 31, 2020

(65) Prior Publication Data
US 2021/0107688 A1 Apr. 15, 2021

(30) Foreign Application Priority Data
Oct. 10, 2019 (CN) .......................... 201910957601.4

(51) Int. Cl.
*G06V 20/13* (2022.01)
*B64G 1/10* (2006.01)
*G01C 21/00* (2006.01)

(52) U.S. Cl.
CPC .... *B64G 1/1021* (2013.01); *B64G 2001/1028* (2013.01); *G01C 21/3852* (2020.08); *G06V 20/13* (2022.01)

(58) Field of Classification Search
CPC .......... B64G 1/1021; B64G 2001/1028; G01C 21/3852; G06V 20/13
See application file for complete search history.

(56) References Cited

U.S. PATENT DOCUMENTS

| | | | |
|---|---|---|---|
| 10,474,976 B2 * | 11/2019 | Clancy | ............... H04B 7/18502 |
| 2012/0188372 A1 * | 7/2012 | Ozkul | ................... B64G 1/1021 348/E7.085 |

(Continued)

FOREIGN PATENT DOCUMENTS

| | | |
|---|---|---|
| CN | 106681807 A | 5/2017 |
| CN | 110210700 A | 9/2019 |

*Primary Examiner* — Syed Haider

(57) ABSTRACT

The present invention discloses a partition satellite mission planning method for earliest completion of regional target coverage, which includes the following steps: 1. partitioning a to-be-observed rectangular region; 2. allocating observation resources to different regions and selecting certain coverage opportunities and coverage modes thereof to minimize completion time corresponding to a formed coverage solution. The present invention can obtain a satisfactory solution capable of finishing complete coverage of regional targets as early as possible with sufficient observation resources through suitable calculation resources and achieve balance between the consumption of calculation resources and optimality of solutions, so that satellite resources can be fully used to conduct the quick and effective coverage search for important regional targets in a real environment.

10 Claims, 9 Drawing Sheets

(56) References Cited

U.S. PATENT DOCUMENTS

| | | | | |
|---|---|---|---|---|
| 2015/0363641 | A1* | 12/2015 | Navulur | G09B 29/106 |
| | | | | 382/113 |
| 2018/0172823 | A1* | 6/2018 | Tyc | G01S 13/9056 |
| 2018/0310124 | A1* | 10/2018 | Regan | H04W 4/021 |
| 2020/0302644 | A1* | 9/2020 | Sameer | G06T 7/55 |
| 2021/0200984 | A1* | 7/2021 | Miyashita | G06F 18/241 |

* cited by examiner

PARTITION SATELLITE MISSION PLANNING METHOD FOR EARLIEST COMPLETION OF REGIONAL TARGET COVERAGE

CROSS-REFERENCE TO RELATED APPLICATIONS

This application claims the benefit of priority from Chinese Patent Application No. 201910957601.4, filed on Oct. 10, 2019. The content of the aforementioned applications, including any intervening amendments thereto, is incorporated herein by reference in its entirety.

TECHNICAL FIELD

The present invention belongs to the field of regional target mission planning for earth observation satellites, and particularly relates to a partition satellite mission planning method for earliest completion of regional target coverage.

BACKGROUND OF THE PRESENT INVENTION

Earth observation satellites (EOS) or imaging satellites (abbreviated as satellites hereinafter) have a main function of observing land, oceans and atmosphere through satellite borne sensors (such as visible light cameras and multispectral cameras). Observation requirements are proposed by users from various fields and departments and collected by a ground control center of the satellites. The control center comprehensively formulates an imaging coverage plan of each satellite according to the observation requirements in combination with the application conditions of satellite resources, and generates measurement and control instructions to be transmitted to the satellites via a ground measurement and control station. The satellites make corresponding actions after receiving the instructions to image a specified region. The image data is temporarily saved in a satellite borne hard drive. When the satellites can communicate with the ground station, the image data is transmitted to the ground station. In this process, the link that the ground control center formulates the satellite imaging plan is called satellite mission planning, which is one of key links in the entire satellite application management process.

In the traditional satellite application modes, the satellites formulate the plans separately and perform the imaging missions separately. No collaborative observation is carried out among different satellites. As the number of satellites increases, it is possible to use multiple satellites to collaboratively perform the imaging observation for earth. The collaborative regional imaging of multiple satellites is actually needed.

The satellite can only photograph a strip region of limited length and width at one pass. If the to-be-observed region is large, it is difficult for the satellite to completely observe the entire region at one pass. If the user urgently needs the image data of the region, multiple satellites can be used to perform the collaborative imaging at multiple passes. Since tracks of sub-satellite points of each satellite are not necessarily parallel, the imaging strips may be overlapped. If the satellites are not properly arranged, a large number of strips may be overlapped, causing repeated observation of some regions, while some regions are not observed, which is not conducive to the rational utilization of resources. In order to better use the existing satellite coverage resources, a rational plan should be formulated to solve the above contradiction. It is a typical optimization problem of operations research, which needs to be urgently solved. When the to-be-observed region with this problem is large, a conventional regional target planning method may consume a great amount of calculation resources due to the large scale and high complexity of the problem. This is unfavorable for the application of the method in actual engineering environments.

SUMMARY OF THE PRESENT INVENTION

In order to solve the defects in the prior art, the present invention provides a partition satellite mission planning method for earliest completion of regional target coverage so as to obtain a satisfactory solution capable of completing the complete coverage of regional targets as early as possible with sufficient observation resources through suitable calculation resources, and to achieve balance between the consumption of calculation resources and the optimality of solutions, so that the satellite resources can be fully used to conduct quick and effective coverage search for important regional targets in a real environment.

To solve the technical problems, the present invention adopts the following technical solutions:

Compared with the prior art, the present invention has the following beneficial effects:

1. According to a "divide-and-rule" concept, the present invention proposes a solving strategy based on partition, that is, a large to-be-observed region is divided into a plurality of small subregions; coverage resources are allocated to each subregion; each subregion is solved separately; and the solutions of all subregions are combined to form overall coverage solution, thereby reducing the problem scale and alleviating the optimization difficulty. Different allocation solutions of coverage resources may lead to different overall coverage solutions, so that a simulated annealing method is proposed to search an optimal resource allocation solution.

2. A grid discretization method is used to process the to-be-observed subregions, and the original problem is converted to a problem of covering each grid, so that the coupling with the calculation geometry can be reduced. At the same time, based on grids, a longest basic coverage mode set of each observation opportunity is built as an optional coverage mode set, and decision variables are changed from values in a continuous space to values in a discrete space, thereby reducing the calculation amount.

3. The present invention utilizes a two-phase heuristic algorithm to find a desirable coverage solution for each discretized subregion. At a first phase, a dynamic greed rule is used to find a desirable feasible coverage solution capable of being quickly obtained under the current environment. At a second phase, after a coverage opportunity with maximum end time in the selected coverage opportunities is removed on the basis of the existing solutions, the coverage solution is re-planned to improve the quality of the solutions. The two-phase heuristic algorithm is a polynomial time algorithm. When the total number of the coverage modes is in a rational range, the algorithm is high in solving speed, easy to implement, high in interpretability, stable and reliable, so that in the simulated annealing process of the method, a desirable coverage solution can be rapidly and effectively found to increase the search speed for a solution space of allocation solutions.

DETAILED DESCRIPTION OF THE PRESENT INVENTION

Figure 1:
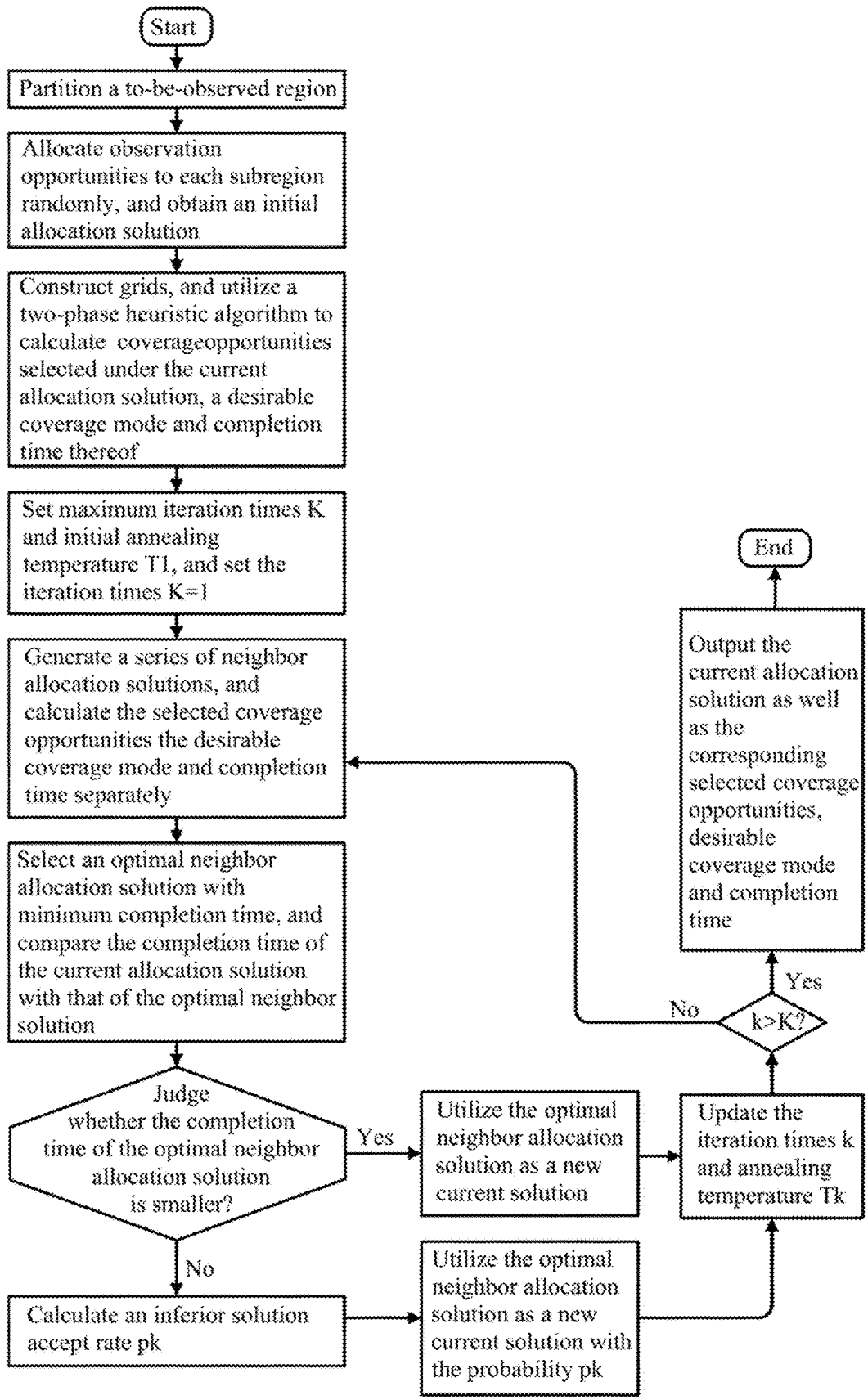
FIG. 1 is a flow chart of a partition satellite mission planning method for earliest completion of regional target coverage of the present invention.
Figure 2A:
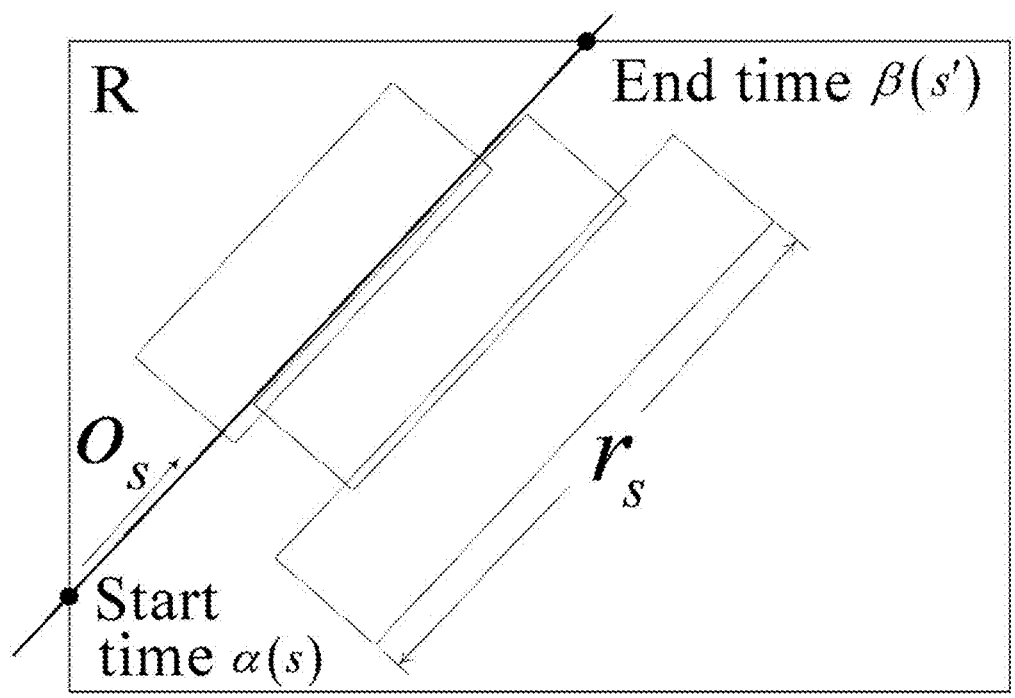
FIG. 2a is a schematic diagram of left lower corner oblique coverage of a region target of the present invention.
Figure 2B:
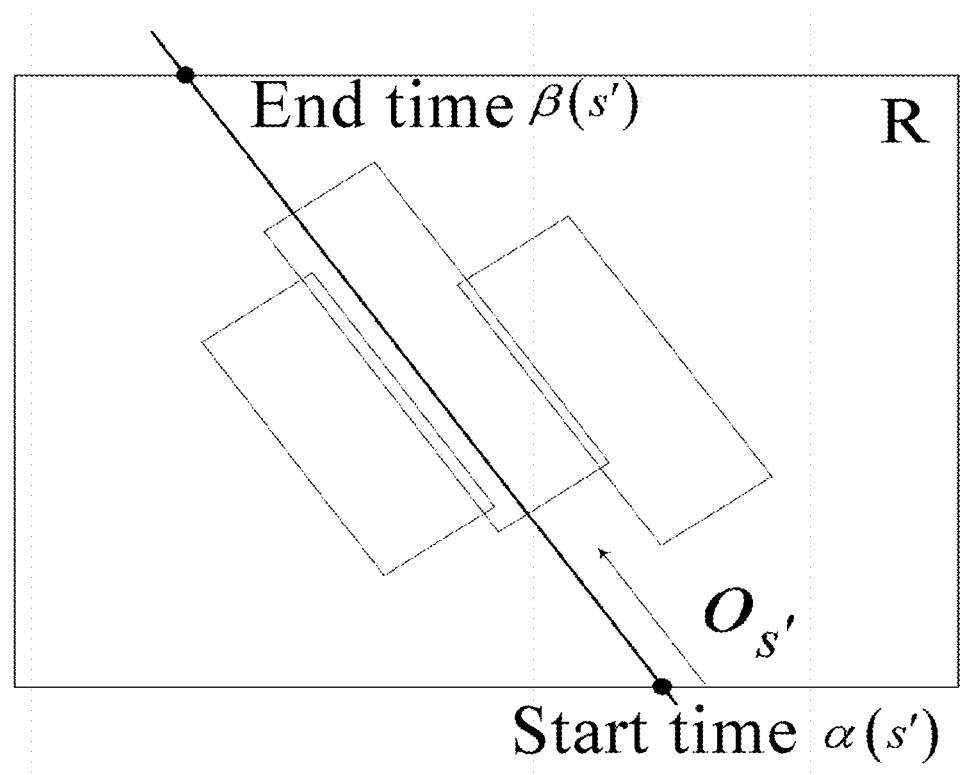
FIG. 2b is a schematic diagram of right lower corner oblique coverage of the region target of the present invention.
Figure 2C:
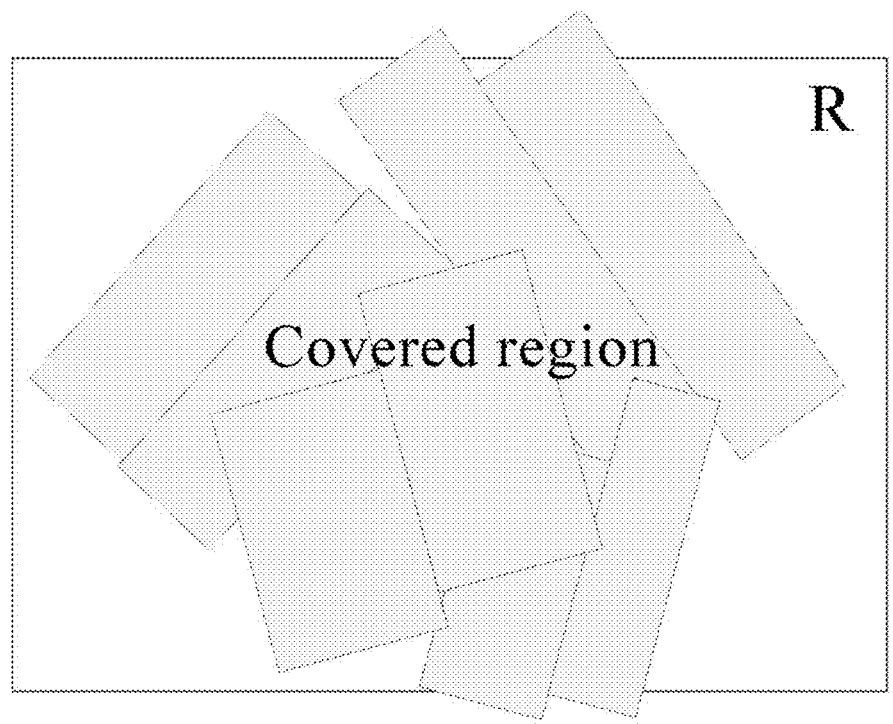
FIG. 2c is a schematic diagram of multi-satellite collaborative coverage of the present invention.
Figure 3A:
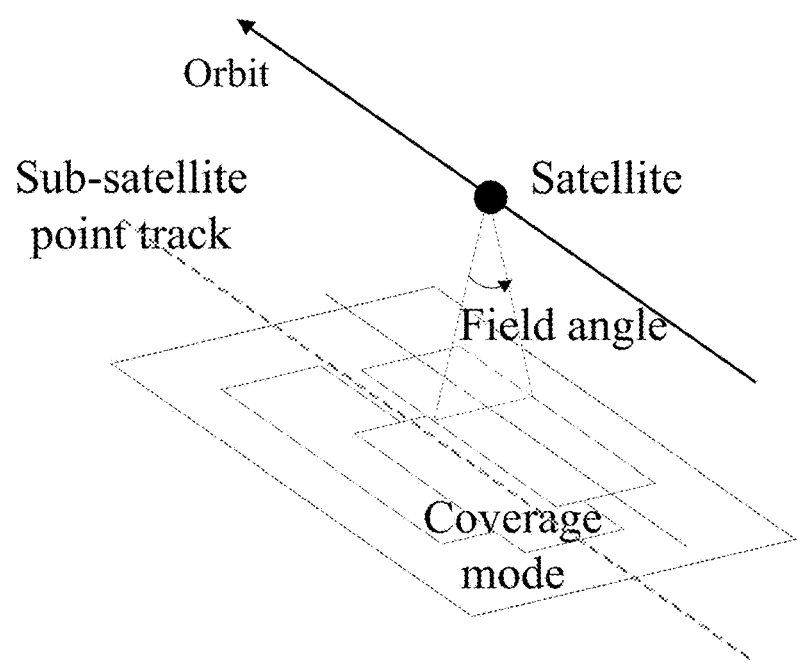
FIG. 3a is a schematic diagram of formation of coverage modes of the present invention.
Figure 3B:
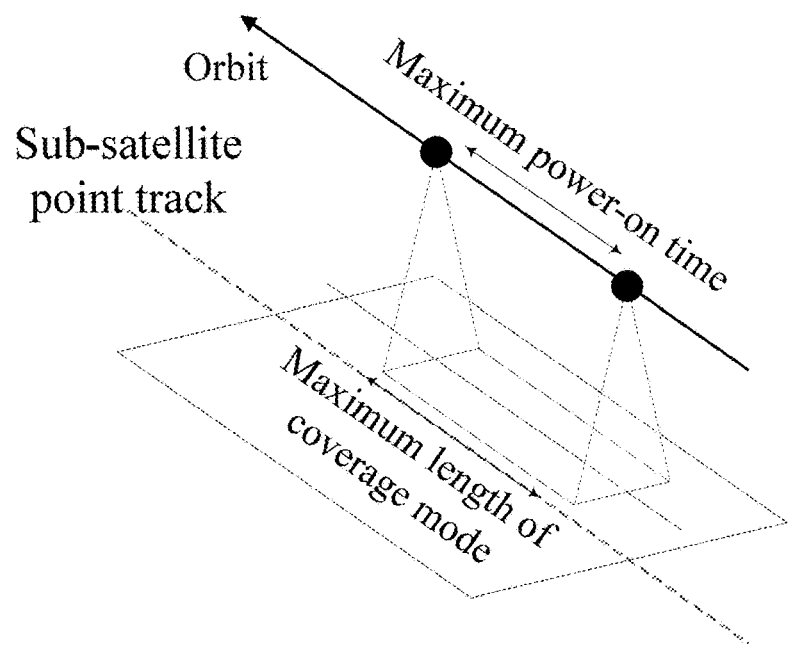
FIG. 3b is a schematic diagram of a longest coverage mode length of the present invention.
Figure 3C:
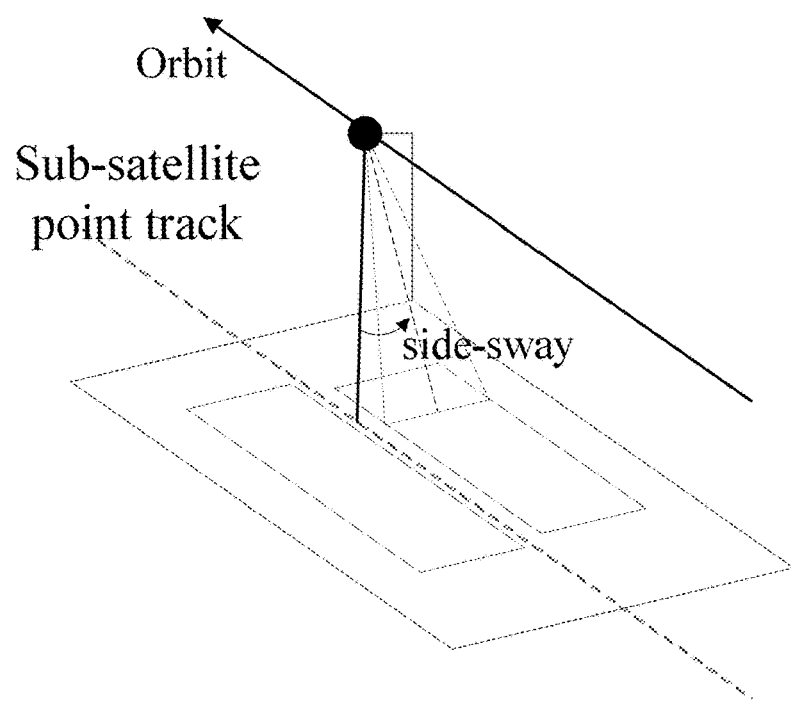
FIG. 3c is a schematic diagram of side-sway of satellites of the present invention.
Figure 3D:
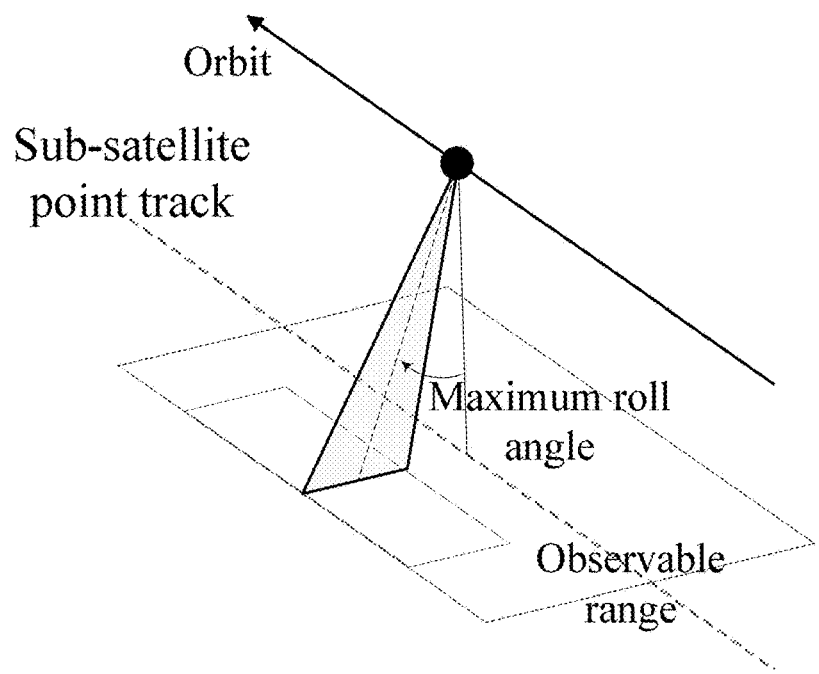
FIG. 3d is a schematic diagram of a maximum roll angle of the present invention.

As shown in FIG. 2a, FIG. 2b and FIG. 2c, in the present embodiment, a partition satellite mission planning method for earliest completion of regional target coverage is used to select a subset from sufficient coverage opportunity set S and to plan corresponding coverage modes for completely covering a to-be-observed region R. The optimization purpose of this method is to minimize the completion time. The coverage opportunity refers to an opportunity for a satellite to perform the coverage observation when passing over the to-be-observed region. As shown in FIG. 2c, an area of the to-be-observed region R is large. The single coverage opportunity can only cover a small part, so that a plurality of coverage opportunities are needed for collaborative observation.

As shown in FIG. 3a, FIG. 3b, FIG. 3c and FIG. 3d, each coverage opportunity s∈s has own attribute and includes sub-satellite point track $o_s$, height $h_s$ of the satellite to the ground and maximum power-on time $m_s$, corresponding to a maximum length of coverage mode $r_s$, maximum roll angle $v_s$ and camera field angle $w_s$. The satellite orbits around the Earth, and a track formed by sub-satellite points on the ground should be a curve actually, but it can be approximated to a straight line in a small range inside the to-be-observed region. In order to simplify the problem, the sub-satellite point track $o_s$ of the coverage opportunity is considered as the straight line in the present embodiment of the present invention. As shown in FIG. 2a and FIG. 2b, each coverage opportunity has a start time α(s) and an end time β(s) for the to-be-observed region R.

The so-called coverage mode c is a rectangular strip photographed by the satellites and determined by a certain roll angle and on/off time selected by one coverage opportunity.

A coordinate system o-xy is established by adopting any vertex of the to-be-observed rectangular region R as an origin o and two sides adjacent to the origin as axis x and axis y. The coordinates of four vertexes of the to-be-observed rectangular region R are marked as left upper corner vertex LU(R), left lower corner vertex LD(R), right upper corner vertex RU(R) and right lower corner vertex RD(R) respectively. The partition satellite mission planning method includes the following steps:

Step 1: a to-be-observed rectangular region R is partitioned.

Step 1.1: length $L_p$ and width $W_p$ of each subregion are set.

Step 1.2: the length $L_R$ and width $W_R$ of the to-be-observed rectangular region R are calculated according to the coordinates of four vertexes of the to-be-observed rectangular region R.

Step 1.3: $L_p$ is divided by $L_R$ to obtain length section number $D_L$ and remainder $R_L$ of the subregion. If the remainder $$R_L \geq \frac{D_L}{2D_L+1} L_p, D_L + 1$$

is assigned to $D_L$. $W_p$ is divided by $W_R$ to obtain width section number $D_W$ and remainder $R_W$ of the subregion, and if the remainder $$R_W \geq \frac{D_W}{2D_W+1} W_p, D_W + 1$$

is assigned to $D_W$.

Step 1.4: $L_R$ is divided by $D_L$ to obtain length $L_f$ of the final subregion, and $W_R$ is divided by $D_W$ to obtain width $W_f$ of the final subregion.

Step 1.5: according to the length $L_f$ and width $W_f$ of the final subregion, the to-be-observed rectangular region R is equally partitioned, thereby obtaining the coordinates of four vertexes of each subregion.

Step 1.5.1: let i=1, the left upper corner coordinate LU(R) of the to-be-observed rectangular region R is used as the left upper corner coordinate $LU(n_i)$ of the $i^{th}$ subregion $n_i$.

Step 1.5.2: the abscissa value of the left upper corner coordinate $LU(n_i)$ of the $i^{th}$ subregion $n_i$ is added with $L_f$ to obtain the right upper corner coordinate $RU(n_i)$ thereof. The ordinate value of the left upper corner coordinate $LU(n_i)$ is added with $W_f$ to obtain the left lower corner coordinate $LD(n_i)$ thereof. The ordinate value of the right upper corner coordinate $RU(n_i)$ is added with f to obtain the right lower coordinate $RD(n_i)$.

Step 1.5.3: if the right lower corner coordinate $RD(n_i)$ of the $i^{th}$ subregion $n_i$ is equal to the right lower corner coordinate RD(R) of the to-be-observed rectangular region R, step 1.5.6 is carried out; otherwise, step 1.5.4 is carried out.

Step 1.5.4: if the abscissa value of the right upper corner coordinate $RU(n_i)$ of the $i^{th}$ subregion $n_i$ is equal to the abscissa value of the right upper corner coordinate RU(R) of the to-be-observed rectangular region R, $LD(n_{(i-D_L+1)})$ is used as the left upper corner coordinate $LU(n_{i+1})$ of the $(i+1)^{th}$ subregion $n_{i+1}$; otherwise, the right upper corner coordinate $RU(n_i)$ of the $i^{th}$ subregion $n_i$ is used as the left upper corner coordinate $LU(n_{i+1})$ of the $(i+1)^{th}$ subregion $n_{i+1}$.

Step 1.5.5: after i+1 is assigned to i, step 1.5.2 is carried out to construct the coordinates of four vertexes of a next subregion.

Step 1.5.6: the partitioning is ended, and the coordinates of four vertexes of each subregion are outputted.

Step 1.6: a set N of the subregions is obtained, and the total number of the subregions is $|N|=D_L \times D_W$.

Step 2: observation resources are allocated to different regions, and a certain subset of coverage opportunities and corresponding coverage modes are selected to minimize the completion time of a formed coverage solution. That is, different coverage opportunities are responsible for covering different subregions, while different allocation solutions may finally lead to different coverage solutions which correspond to different completion time. Therefore, a simulated annealing method is used to search an optimum allocation solution here.

Step 2.1: the coverage opportunities are randomly allocated to each subregion to form an initial current allocation solution $Y=\{y^s|\forall s \in S\}$ wherein the value of $y_s$ represents the subregion where the coverage opportunity s is allocated.

Step 2.2: the coverage opportunity set $S^*(Y)$ selected under the current allocation solution Y, a desirable coverage mode set $C^*(Y)$ and corresponding completion time $F(Y)$ are calculated.

Step 2.2.1: different subregions and the set of coverage opportunities allocated to different subregions are used as inputs to construct grids, and a two-phase heuristic algorithm is used to calculate the coverage opportunity set selected for different subregions as well as the desirable coverage solution and corresponding completion time.

Step 2.2.1.1: the $i^{th}$ subregion is divided into a plurality of consistent square grids to obtain a grid set $J_i$, wherein a side length of each grid should be minimized. The existing grids are ensured to be completely covered by the coverage modes.

If the to-be-observed region was not partitioned into subregions, the whole large region may form a large number of grids A large number of coverage modes may be generated based on these grids, which consumes vast calculation resources. Some large-scale calculation examples cannot even obtain a solution within a rational time, so that embodiments of the present invention are proposed on the basis of solving strategies based on the partition.

Step 2.2.1.2: according to the divided grid set $J_i$, a set of longest basic coverage modes is generated for each coverage opportunity in set $S_i$ allocated to the $i^{th}$ subregion $n_i$, and jointly form a main set $C_i$ of the optional coverage modes.

Figure 4A:
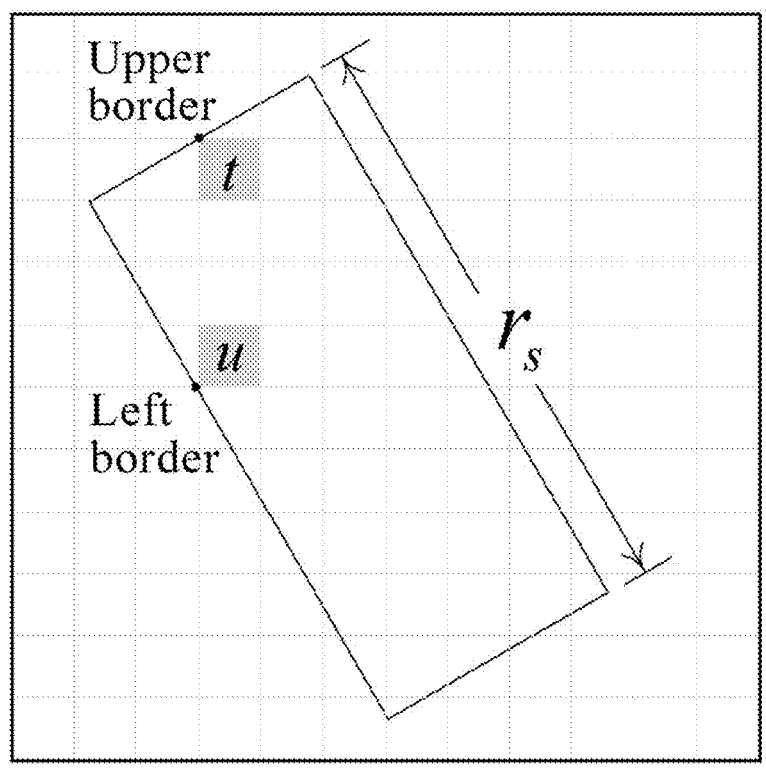
FIG. 4a is a schematic diagram of a longest basic coverage mode of a right lower corner oblique type of the present invention.
Figure 4B:
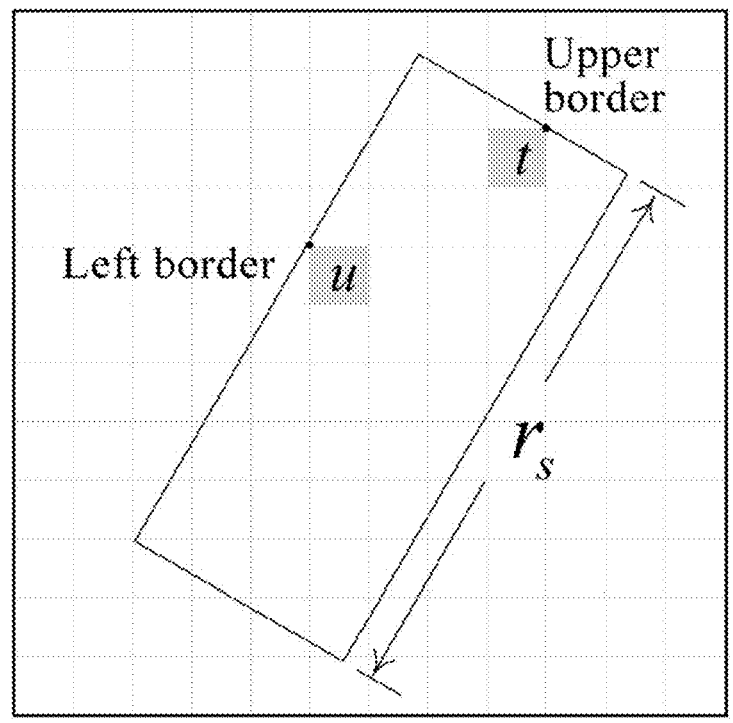
FIG. 4b is a schematic diagram of the longest basic coverage mode of a left lower corner oblique type of the present invention.

As shown in FIG. 4a and FIG. 4b, the longest basic coverage mode refers to that the length is equal to the maximum length $r_s$, and there are two grids that satisfy the following two conditions:

① Both grids are completely covered by the coverage mode, that is, the four vertexes are within the area covered by the coverage mode;

② one grid has a vertex located on a left border of the coverage mode and is named left grid, and the other grid has a vertex located on an upper border of the coverage mode and is named upper grid. The left grid and the upper grid can be the same.

Each coverage opportunity can select infinitely many on/off time and roll angles, so each coverage opportunity may actually correspond to an infinite number of coverage modes. However, all coverage modes cannot be enumerated. Therefore, the solving method of the problem is difficult to design on the basis of the universal set of all coverage modes. The longest basic coverage mode is a special coverage mode and can substitute a majority of non-longest basic coverage modes and is limited in quantity. A majority of non-longest basic coverage modes may be slightly adjusted to be the corresponding longest basic coverage modes without reducing the number of completely covered grids.

Step 2.2.1.2.1: if $S_i=\emptyset$, step 2.2.1.2.4 is carried out; otherwise, step 2.2.1.2.2 is carried out.

Step 2.2.1.2.2: one of coverage opportunities $s \in S_i$ is selected, and according to the type of the coverage opportunity s, methods in step 2.2.1.2.2.1 to step 2.2.1.2.2.10 are used to construct a longest basic coverage mode set $C_s$ based on the grid set $J_i$ for the coverage opportunity s.

Step 2.2.1.2.2.1: the type of the coverage opportunity s is judged according to the sub-satellite point track $o_s$ of the coverage opportunity s, and the types include a right lower corner oblique type and a left lower corner oblique type.

Step 2.2.1.2.2.2: let set $C_s=\emptyset$.

Step 2.2.1.2.2.3: subsets $J_s$ are selected from the grid set $J_i$, and each grid in the subsets $J_s$ may be used as the left grid of a longest basic coverage mode of the coverage opportunity s.

Step 2.2.1.2.2.3.1: let $J_s=\emptyset$.

Step 2.2.1.2.2.3.2: the set $J_i$ is traversed, and the camera roll angle $$\sigma_s(u) = \arctan \frac{d_s^u}{h_s} - \frac{w_s}{2}$$

of the coverage opportunity s is calculated when each grid u is used as the left grid of the coverage mode. If the coverage opportunity is the right lower corner oblique type, as shown in FIG. 4a, $d_s^u$ is a distance between the left lower corner vertex $LD(u)$ of the grid u and the sub-satellite point track $o_s$ of the coverage opportunity s. If the coverage opportunity is the left lower corner oblique type, as shown in FIG. 4b, $d_s^u$ is a distance between the left upper corner vertex $LU(u)$ of the grid u and the sub-satellite point track $o_s$ of the coverage opportunity s. If $|\sigma_s(u)| \leq v_s$, the grid u is added into the subset $J_s$ of the left grid.

Step 2.2.1.2.2.4: if $J_s=\emptyset$, step 2.2.1.2.2.10 is carried out; otherwise, after one grid p in $J_s$ is selected, step 2.2.1.2.2.5 is carried out.

Step 2.2.1.2.2.5: according to the grid p, the grid subset $J_s^p$ is selected from the grid set $J_i$, and when p is used as the left grid, each grid in $J_s^p$ may be used as the upper grid to form a longest basic coverage mode of the coverage opportunity s together with p.

Step 2.2.1.2.2.5.1: let $J_s^p=\emptyset$.

Step 2.2.1.2.2.5.2: a strip width $\eta_s(p)$ of the coverage mode when the grid p is used as the left grid is calculated by using the formula (1):

$$\eta_s(p) = \begin{cases} d_s^p - h_s \cdot \tan\left(\arctan \frac{d_s^p}{h_s} - w_s\right), & \arctan \frac{d_s^p}{h_s} > w_s \\ d_s^p + h_s \cdot \tan\left(w_s - \arctan \frac{d_s^p}{h_s}\right), & \arctan \frac{d_s^p}{h_s} \leq w_s \end{cases} \quad (1)$$

Figure 5A:
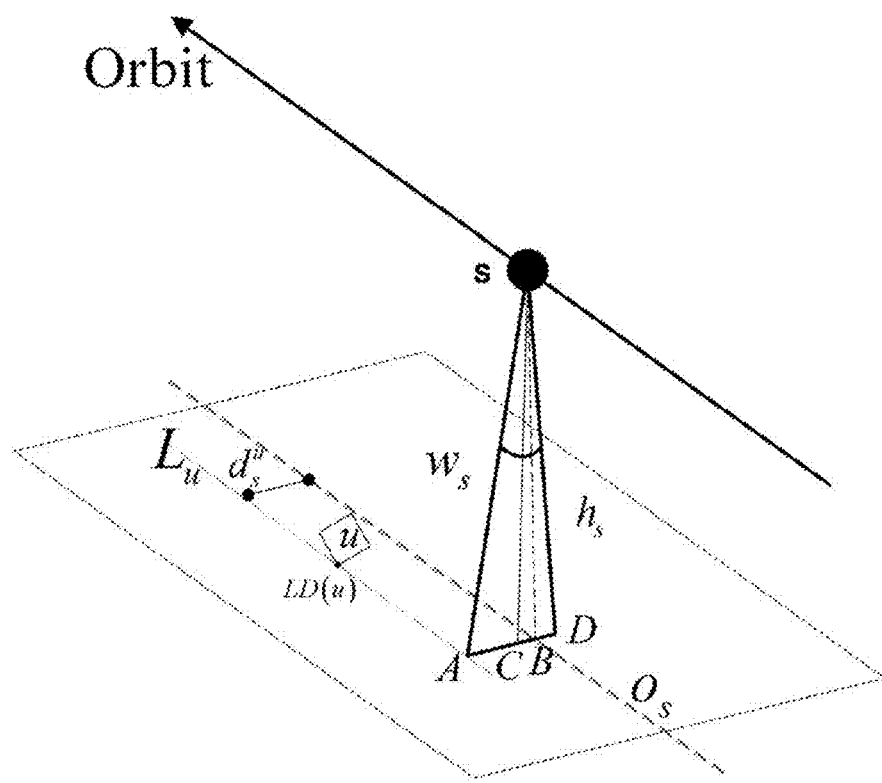
FIG. 5a is a schematic diagram of calculation of a roll angle under one condition of the present invention.
Figure 5B:
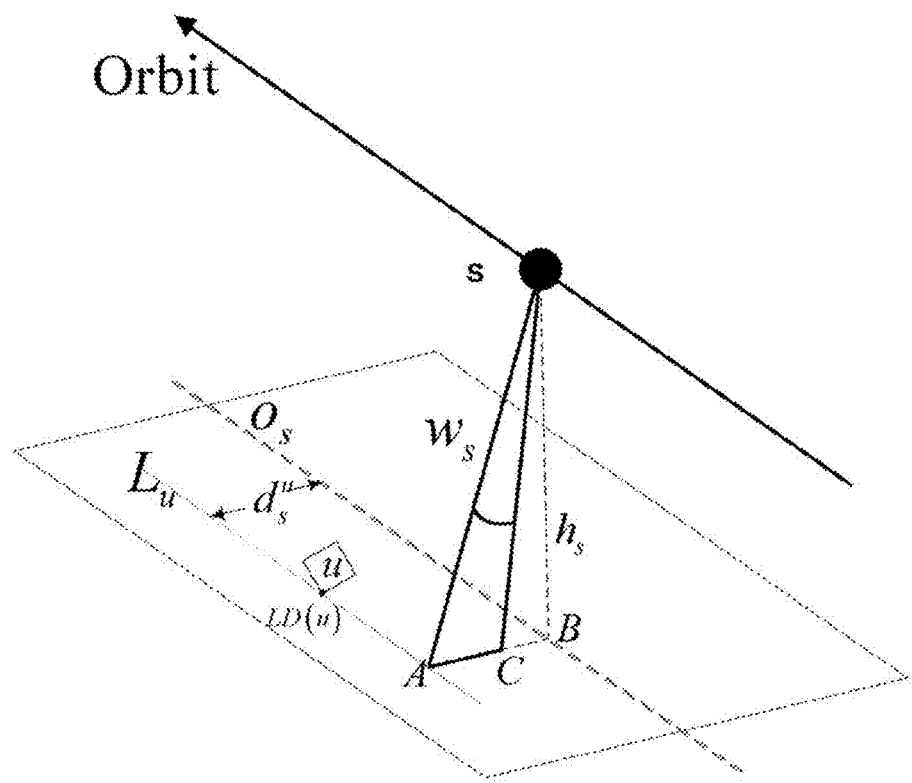
FIG. 5b is a schematic diagram of calculation of a roll angle under another condition of the present invention.

As shown in FIG. 5a and FIG. 5b, when the grid u is used as the left grid of the coverage mode, a calculation formula of the camera roll angle $\sigma_s(u)$ of the coverage opportunity s and the strip width $\eta_s(u)$ of the coverage mode can both be obtained by elementary geometry. OB is a vertical line, and the length of OB is the height of the satellite to the ground, i.e. $h_s$. The length of AB is a distance between the straight lines $L_u$ and $o_s$, i.e. $d_s^u$. Apparently, ∠ABO is a right angle, so it is easy to get:

$$\angle AOB = \arctan\frac{d_s^u}{h_s},$$

and the camera roll angle $$\sigma_s(u) = \arctan\frac{d_s^u}{h_s} - \frac{w_s}{2}.$$

In FIG. 5a, ∠AOC is a field angle, i.e. $w_s$, while ∠AOB>$w_s$. The width of the strip is the length of AC at this moment.

$$AC = d_s^u - BC = d_s^u - h_s \cdot \tan\angle BOC =$$
$$d_s^u - h_s \cdot \tan(\angle AOB - w_s) = d_s^u - h_s \cdot \tan\left(\arctan\frac{d_s^u}{h_s} - w_s\right)$$

In FIG. 5b, ∠AOD is a field angle, i.e. $w_s$. OC is an angular bisector of ∠AOD, i.e.

$$\angle AOC = \frac{w_s}{2}.$$

The width of the strip is length of AD at this moment.

$$\angle AOB = \arctan\frac{d_s^u}{h_s}, \angle DOB = w_s - \angle AOB,$$

so it can obtain: $BD = h_s \cdot \tan \angle DOB$, and it can further obtain:

$$AD = d_s^u + BD = d_s^u + h_s \cdot \tan\angle BOD =$$
$$d_s^u + h_s \cdot \tan(w_s - \angle AOB) = d_s^u + h_s \cdot \tan\left(w_s - \arctan\frac{d_s^u}{h_s}\right)$$

Step 2.2.1.2.2.5.3: the set $J_t$ is traversed. Whether one grid t satisfies the following four conditions is checked. If all conditions are satisfied, the grid t is added into $J_s^p$; otherwise, the next grid is checked.

Figure 6A:
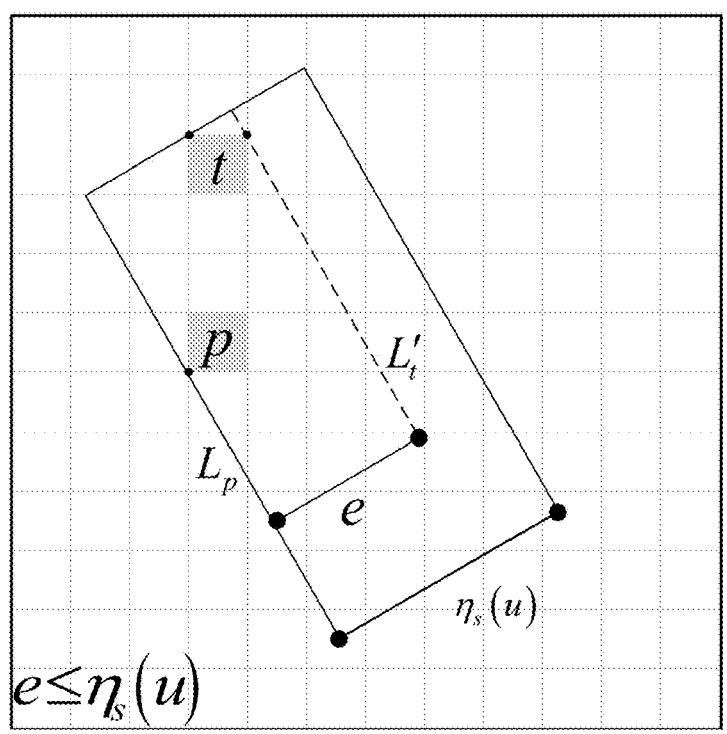
FIG. 6a is a schematic diagram of a feasible upper grid condition 1 of the present invention.

If the coverage opportunity is the right lower corner oblique type, the four conditions are:

① as shown in FIG. 6a, the straight line $L_p \| o_s$ is made through the left lower corner vertex of the grid p, the straight line $L_t' \| o_s$ is made through the right upper corner vertex of t, and the distance between the straight lines $L_p$ and $L_t'$ cannot exceed the width $\eta_s(p)$ of the strip.

Figure 6B:
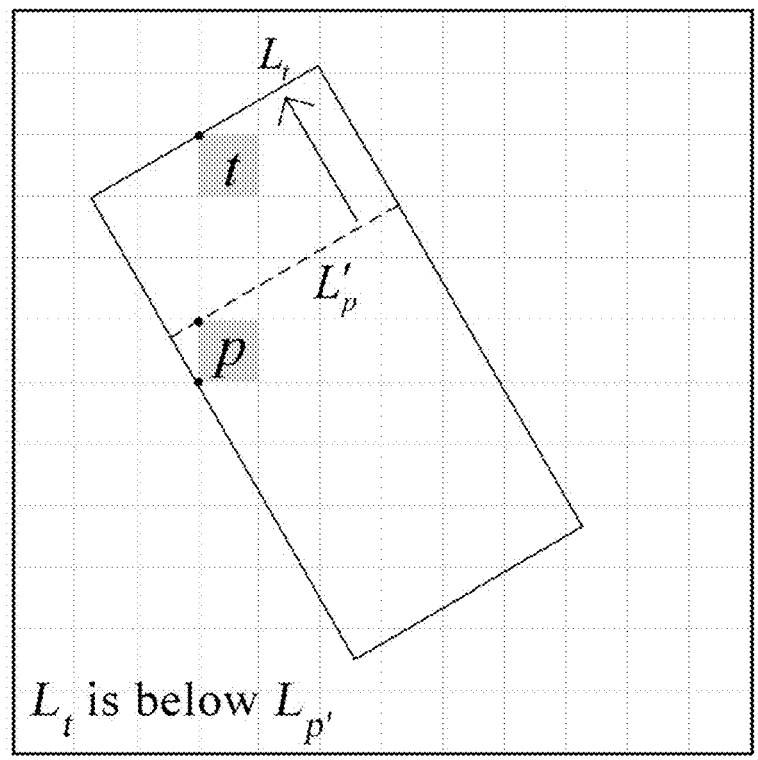
FIG. 6b is a schematic diagram of a feasible upper grid condition 2 of the present invention.

② as shown in FIG. 6b, the straight lines $L_p' \perp o_s$ and $L_t \perp o_s$ are made respectively through the left upper corner vertexes of the grids p and t, and $L_t$ is above $L_p'$.

Figure 6C:
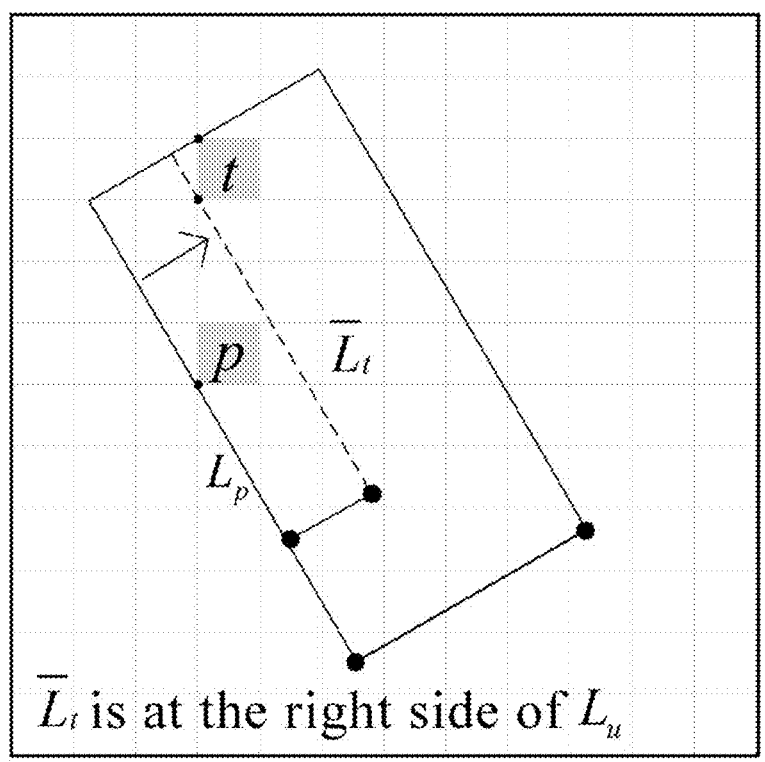
FIG. 6c is a schematic diagram of a feasible upper grid condition 3 of the present invention.

③ as shown in FIG. 6c, the straight line $\overline{L_t} \| o_s$ is made through the left lower corner vertex of the grid t, and the straight line $\overline{L_t}$ is at the right side of $L_p$.

Figure 6D:
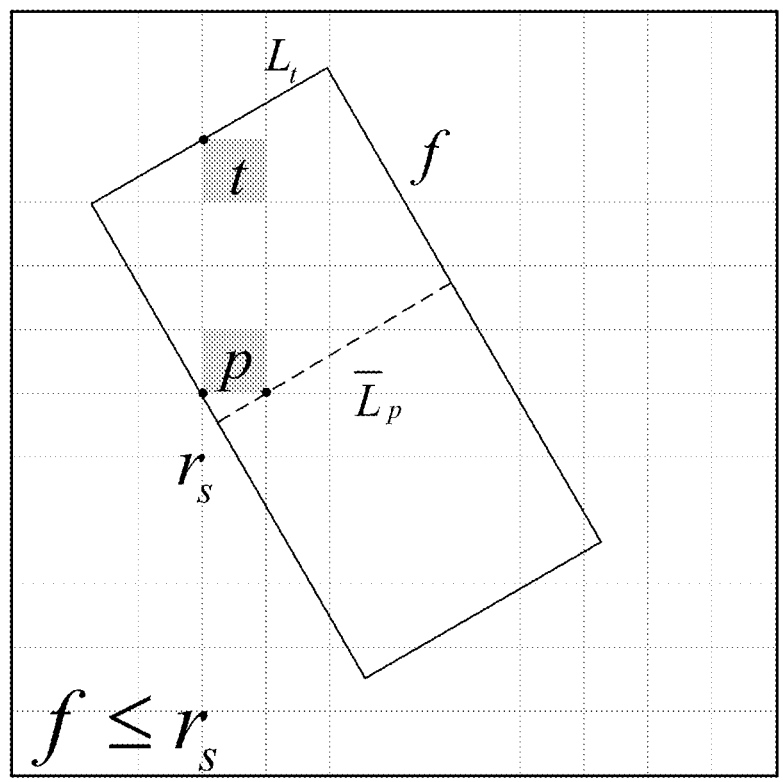
FIG. 6d is a schematic diagram of a feasible upper grid condition 4 of the present invention.

④ as shown in FIG. 6d, the straight line $\overline{L_p} \perp o_s$ is made through the right lower corner vertex of the grid p, and the distance between the straight lines $\overline{L_p}$ and $L_t$ cannot exceed the length $l_s$ of the strip. "∥" indicates a parallel relation, and "⊥" indicates a vertical relation.

If the coverage opportunity is the left lower corner oblique type, the four conditions are:

① The straight line $L_p \| o_s$ is made through the left upper corner vertex of the grid p, the straight line $L_t' \| o_s$ is made through the right upper corner vertex of t, and the distance between the straight lines $L_p$ and $L_t'$ cannot exceed the width $\eta_s(p)$ of the strip.

② The straight lines $L_p' \perp o_s$ and $L_t \perp o_s$ are made respectively through the right upper corner vertexes of the grids p and t, and $L_t$ is above $L_p'$.

③ The straight line $\overline{L_t} \| o_s$ is made through the left upper corner vertex of the grid t, and the straight line $\overline{L_t}$ is at the right side of $L_p$.

④ The straight line $\overline{L_p} \perp o_s$ is made through the left lower corner vertex of the grid p, and the distance between the straight lines $\overline{L_p}$ and $L_t$ cannot exceed the length $l_s$ of the strip. "∥" indicates a parallel relation, and "⊥" indicates a vertical relation.

Apparently, the grid p also satisfies the four conditions.

Step 2.2.1.2.2.6: if $J_s^P = \emptyset$, step 2.2.1.2.2.9 is carried out; otherwise, after one grid q in $J_s^P$ is selected, step 2.2.1.2.2.7 is carried out.

Step 2.2.1.2.2.7: based on the grids P and q, the longest basic coverage $c_s(p,q)$ belonging to the coverage opportunity s is constructed.

Step 2.2.1.2.2.7.1: if the coverage opportunity is the right lower corner oblique type, the straight line $L_p \| o_s$ is made through the left lower corner vertex LD(p) of the grid p, and the straight line $L_q \perp o_s$ is made through the left upper corner vertex LU(q) of the grid q. If the coverage opportunity is the left lower corner oblique type, the straight line $L_p \| o_s$ is made through the left upper corner vertex LU(p) of the grid p, and the straight line $L_q \perp o_s$ is made through the right upper corner vertex RU(q) of the grid q.

Step 2.2.1.2.2.7.2: the strip width $\eta_s(p)$ of the coverage mode when the grid p is used as the left grid is calculated.

Step 2.2.1.2.2.7.3: the straight line $\overline{L_p}$ is made so as to satisfy:
① $\overline{L_p} \| L_p$;
② (the distance between $\overline{L_p}$ and $L_p$ is equal to $\eta_s(p)$;
③ $\overline{L_p}$ is at the right side of $L_p$.

Step 2.2.1.2.2.7.4: the straight line $\overline{L_q}$ is made so as to satisfy:
① $L_q \| L_q$;
② (the distance between $\overline{L_q}$ and $L_q$ is equal to $l_s$;
③ $\overline{L_q}$ is at the lower side of $L_q$.

Step 2.2.1.2.2.7.5: four straight lines of $L_p$, $\overline{L_p}$, $L_q$, $\overline{L_q}$ are used as four sides of the rectangle, and intersections of the four straight lines are used as four vertexes of the rectangle to construct the coverage mode $c_s(p,q)$.

Step 2.2.1.2.2.8: $c_s(p,q)$ is added into $C_s$, the grid q is removed from $J_s^P$, and then step 2.2.1.2.2.6 is carried out.

Step 2.2.1.2.2.9: the grid p is removed from $J_s$, and then step 2.2.1.2.2.4 is carried out.

Step 2.2.1.2.2.10: the coverage mode set $C_s$ is outputted.

Step 2.2.1.2.3: the coverage mode opportunity s is removed from $S_i$, and then step 2.2.1.2.1 is carried out.

Step 2.2.1.2.4: let, the coverage mode set $C_i$ is outputted.

Step 2.2.1.3: by utilizing the grid set $J_i$ separated from $i_{th}$ subregion $n_i$, as well as the coverage opportunity set $S_i = \{s | y_s = n_i, s \in S\}$ allocated to $i^{th}$ subregion $n_i$ and optional coverage mode set $C_i$ as inputs, the coverage opportunity subset $S_i^*$ selected by the $i^{th}$ subregion $n_i$ is determined by the two-phase heuristic algorithm, and the coverage mode of each coverage opportunity is selected, so that the desirable coverage mode set $C_i^*$ is obtained, and the completion time $F_i$ thereof can be obtained at the same time.

Step 2.2.1.3.1: by utilizing the grid set $J_i$, the coverage opportunity set $S_i$ and the corresponding coverage mode set $C_i$ as inputs, the selected coverage opportunity subsets $S_i^*$, the selected coverage mode sets $C_i^*$ and the number $A_i$ of corresponding coverable grids can be calculated with the heuristic algorithm.

Step 2.2.1.3.1.1: all coverage opportunities in $S_i$ are sorted in a non-descending order according to the end time to obtain $$\vec{S_i} = \{s_1, s_2, \ldots, s_{|S_i|}\}.$$

Step 2.2.1.3.1.2: the state of all grids in $J_i$ is set as "uncovered", let g=0, and $C_i^*=\emptyset$.

Step 2.2.1.3.1.3: g+1 is assigned to g, the coverage opportunity $s_g$ is extracted from $\vec{S_i}$, and the optional coverage mode set $C_{s_g}$ is traversed. For each coverage mode $C_{s_g}$, the grid capable of being completely covered by $C_{s_g}$ and with the state of "uncovered" is selected from the grid set $J_i$ and marked as valid grid sets $V(c_{s_g})$, while the number is marked as $|V(c_{s_g})|$.

Step 2.2.1.3.1.4: the coverage mode $$c_{s_g}^* = \arg\max_{\forall c_{s_g} \in C_{s_g}} \left| V(c_{s_g}) \right|$$

covering the most valid grids is selected from $C_{s_g}$ and used as the coverage mode selected by the coverage opportunity $s_g$. After $c_{s_g}^*$ is added into $C_i^*$, the state of all grids in the valid grid sets $V(c_{s_g})$ of the coverage mode $c_{s_g}^*$ is changed as "covered".

Step 2.2.1.3.1.5: the number of all grids with the state of "covered" in $J_i$ is calculated and marked as $A_i$.

Step 2.2.1.3.1.6: if $A_i=|J_i|$ or $g=|\vec{S_i}|$, step 2.2.1.3.1.7 is carried out; otherwise, step 2.2.1.3.1.3 is carried out.

Step 2.2.1.3.1.7: the coverage opportunity subset $S_i^*=\{s_1, s_2, \ldots, s_g\}$ as well as the coverage mode set $C_i^*$ thereof and the number $A_i$ of covered grids are outputted.

Step 2.2.1.3.2: if $A_i<|J_i|$, step 2.2.1.3.4 is carried out; otherwise, step 2.2.1.3.3 is carried out.

On the premise of sufficient coverage opportunities, the coverage opportunities that are randomly allocated to each subregion generally can completely cover the subregion, that is, $A_i=|J_i|$. If some subregions cannot be completely covered, they may be improved in neighbor allocation solutions constructed by an insert operator and an exchange operator at the simulated annealing phase.

Step 2.2.1.3.3: $S_i^*$ and $C_i^*$ are optimized by using a promotion algorithm.

Step 2.2.1.3.3.1: one coverage opportunity $$s_m = \arg\max_{\forall s \in S_i^*} \beta(s)$$

with maximum end time in $S_i^*$ is removed from $S_i^*$ to obtain the coverage opportunity set $\overline{S_i}$.

Step 2.2.1.3.3.2: by utilizing the grid set $J_i$, the coverage opportunity set $\overline{S_i}$ and the optional coverage mode set $\overline{C_i}=\{c|\forall c \forall C_s, \forall s \in \overline{S_i}\}$ corresponding to $\overline{S_i}$ as inputs, the selected coverage opportunity subsets $\overline{S_i^*}$, the selected coverage mode set $\overline{C_i^*}$, and the number $\overline{A_i}$ of the corresponding coverable grids can be calculated with the heuristic algorithm.

Step 2.2.1.3.3.2.1: the state of all grids in $J_i$ is set as "uncovered", and $\overline{C_i^*}=\emptyset$.

Step 2.2.1.3.3.2.2: let $\overline{g}=1$.

Step 2.2.1.3.3.2.3: if $\overline{g}>|\overline{C_i}|$, step a.3.3.2.5 is carried out; otherwise, step a.3.3.2.4 is carried out.

Step 2.2.1.3.3.2.4: the $\overline{g}^{th}$ coverage mode in $\overline{C_i}$ is selected, and the grids capable of being completely covered by the $\overline{g}^{th}$ coverage mode and with the state of "uncovered" are selected from the grid set $J_i$ and marked as valid grid set $V(\overline{g})$, while its number is marked as $|V(\overline{g})|$. $\overline{g}+1$ is assigned to $\overline{g}$. Thereafter step a.3.3.2.3 is carried out.

Step 2.2.1.3.3.2.5: if $\overline{C_i}=\emptyset$, step a.3.3.2.8 is carried out; otherwise, step a.3.3.2.6 is carried out.

Step 2.2.1.3.3.2.6: the coverage mode $$\overline{g}^* = \arg\max_{\forall \overline{g} \in \overline{C_i}} \left| V(\overline{g}) \right|$$

with most valid grids in $C_i$ is selected and used as the coverage mode selected by the corresponding coverage opportunity $\overline{s}^*$. $\overline{g}^*$ is added into $\overline{C_i^*}$, and the state of all grids in the valid grid set $V(\overline{g}^*)$ of the coverage mode $\overline{g}^*$ is changed to be "covered".

Step 2.2.1.3.3.2.7: the coverage mode set $C_{\overline{s}^*}$ corresponding to the coverage opportunity $\overline{s}^*$ is removed from the optional coverage mode set $\overline{C_i}$, and then step a.3.3.2.2 is carried out.

Step 2.2.1.3.3.2.8: the coverage mode set $\overline{C_i^*}$, selected by each coverage opportunity is outputted, i.e. the final coverage solution. The number of all "covered" grids in $J_i$ is calculated and marked as $\overline{A_i}$.

Step 2.2.1.3.3.3: if $\overline{A_i}=|J_i|$, $\overline{S_i^*}$ is assigned to $S_i^*$, and $\overline{C_i^*}$ is assigned to $C_i^*$. Thereafter, step 2.2.1.3.3.1 is carried out; otherwise, step 2.2.1.3.4 is carried out.

Step 2.2.1.3.4: the selected coverage opportunity set $S_i^*$ and the coverage mode set $C_i^*$ are outputted. The maximum value of the end time of the coverage opportunity in $S_i^*$ is used as the completion time $F_i$.

The first phase of the two-phase heuristic algorithm in step 2.2.1.3 utilizes the rule based on dynamic greed. The coverage mode covering most valid grids is selected at each time. Once the coverage opportunity selects one coverage mode, the coverage opportunity may exit the subsequent selection activities. Once the grid is covered in the previous selection, the grid exits the subsequent selection activities. The method is simple, fast and effective and very suitable for rapidly obtaining the desirable feasible coverage solution under the current environment. At the second phase, on the basis of the solution obtained at the first phase, after the selected coverage opportunity with maximum end time is deleted, the complete coverage solution is re-planned to search a better solution space of the solution.

Step 2.2.2: the coverage opportunity sets $\{S_i^*|i=1, 2, \ldots, |N|\}$ selected by all subregions are combined to obtain an overall selected coverage opportunity set $S^*$. The coverage solutions $\{C_i^*|i=1, 2, \ldots, |N|\}$ of all subregions are combined to obtain an overall coverage solution C* of the to-be-observed rectangular region R. The maximum value of the completion time $\{F_i|i=1, 2, \ldots, |N|\}$ corresponding to the coverage solutions of all subregions is used as the overall completion time F of the to-be-observed rectangular region R.

The solution space of the allocation solution is searched below by utilizing the simulated annealing method to obtain a better allocation solution, so that the completion time corresponding to the formed coverage solution is minimized, which specifically includes step 2.3-step 2.9:

Step 2.3: maximum iteration times $\overline{k}$ and initial annealing temperature $T_1$ are set, and the iteration times of the current outer cycle is set as k=1.

Step 2.4: if k>$\overline{k}$, step 2.9 is carried out; otherwise, step 2.5 is carried out.

Step 2.5: the insert operator and the exchange operator are used to construct a plurality of neighbor allocation solutions of the current allocation solution Y.

Step 2.5.1: the number of the to-be-constructed neighbor allocation solutions is set as $\overline{m}$, and the number of the constructed neighbor allocation solutions is set as m, and m=0.

Step 2.5.2: the insert operator is used to construct the neighbor allocation solution.

Step 2.5.2.1: an idle coverage opportunity ŝ is found from the unselected coverage opportunity set S'(Y)={S/S*(Y)} under the current allocation solution Y. The end time β(ŝ) of the idle coverage opportunity ŝ is smaller than the overall completion time F(Y) but greater than the completion time $F_{y_ŝ}(Y)$ that the idle coverage opportunity ŝ is allocated to the subregion $y_ŝ$. If the idle coverage opportunity cannot be found, step 2.5.2.4 is carried out; otherwise, step 2.5.2.2 is carried out.

Step 2.5.2.2: m+1 is assigned to m, and the idle coverage opportunity ŝ in the current allocation solutions Y is randomly allocated to one subregion, and the end time β(ŝ) of the idle coverage opportunity ŝ is smaller than the completion time of the allocated subregion, thereby forming a neighbor allocation solution $\overline{Y}_m$.

Step 2.5.2.3: the idle coverage opportunity ŝ is removed from the coverage opportunity set S'(Y), and then step 2.5.2.1 is carried out.

Step 2.5.2.4: all neighbor allocation solutions obtained by utilizing the insert operator are outputted.

Step 2.5.3: the exchange operator is used to construct the neighbor allocation solution.

Step 2.5.3.1: if m≥$\overline{m}$, step 2.5.3.3 is carried out; otherwise, step 2.5.3.2 is carried out.

Step 2.5.3.2: m+1 is assigned to m. Two subregions $n_i$ and $n_j$ are randomly selected from the subregion set N. One coverage opportunity $s_i$ is randomly selected from the coverage opportunity set $\{s|y_s=n_i\}$ allocated to the subregion $n_i$. One coverage opportunity $s_j$ is randomly selected from the coverage opportunity set $\{s|y_s=n_j\}$ allocated to the subregion $n_j$. $s_i$ and $s_j$ are exchanged in the current allocation solution Y, that is, $n_j$ is assigned to $y_{s_i}$, and $n_i$ is assigned to $y_{s_j}$, thereby forming a neighbor coverage solution $\overline{Y}_m$, and then step 2.5.3.1 is carried out.

Step 2.5.3.3: all neighbor allocation solutions obtained by using the exchange operator are outputted.

Step 2.6: the coverage opportunity set selected under each neighbor allocation solution, desirable coverage mode set and corresponding completion time are calculated separately, and the neighbor allocation solution with minimum completion time is selected as the optimal neighbor allocation solution $\overline{Y}^*$. The specific steps refer to step 2.2 and are not repeated here.

Step 2.7: The completion time of the optimal neighbor allocation solution $\overline{Y}^*$ is compared with the completion time of the current allocation solution Y. If $F(\overline{Y}^*) \leq F(Y)$ the optimal neighbor allocation solution $\overline{Y}^*$ is assigned to the current allocation solution Y, and then step 2.8 is directly carried out; otherwise, step 2.8 is carried out after the step 2.7.1-step 2.7.2.

Step 2.7.1: an inferior solution accept rate $$P_k = \exp\left\{\frac{F(Y) - F(\overline{Y}^*)}{T_k}\right\}$$

at $k^{th}$ iteration is calculated.

Step 2.7.2: a random number $r_k$ of 0-1 is generated at $k^{th}$ times. If $r_k \leq p_k$, the optimal neighbor allocation solution $\overline{Y}^*$ is assigned to the current allocation solution Y.

Step 2.8: k+1 is assigned to k, and the annealing temperature $T_k = T_{k-1} \times \lambda$ is updated. λ is a cooling coefficient and is a fixed value less than 1 and greater than 0, and then step 2.4 is carried out.

The annealing temperature represents randomness for searching the solution space. If the requirement for the final solution quality is high, λ may be set to be large, and the iteration times may be increased. If the rapid convergence is required, λ is set to be small.

Step 2.9: the current allocation solution Y as well as the overall selected coverage opportunity set S*(Y) under the allocation solution, better coverage modes C*(Y) of each coverage opportunity and corresponding completion time F(Y) are outputted.

We claim:

1. A partition satellite mission planning method for earliest completion of regional target coverage, wherein the partition satellite mission planning method comprises:
   step 1: partitioning a to-be-observed rectangular region R;
   step 2: allocating observation resources to different regions, and selecting a coverage opportunity and a coverage mode thereof to minimize a completion time of a formed coverage solution, comprising:
   step 2.1: randomly allocating the coverage opportunity to each subregion to form an initial current allocation solution Y={$y_s$|∀s∈S}, wherein the value of $y_s$ represents the subregion where the coverage opportunity s is allocated, and S represents a coverage opportunity set;
   step 2.2: calculating the coverage opportunity set S*(Y) selected under the current allocation solution Y, a better coverage mode set C*(Y) and corresponding completion time F(Y);
   step 2.3: setting maximum iteration times $\overline{k}$ and initial annealing temperature $T_1$, and setting iteration times of a current outer cycle as k=1;
   step 2.4: if k>$\overline{k}$, carrying out step 2.9; otherwise, carrying out step 2.5;
   step 2.5: using an insert operator and an exchange operator to construct a plurality of neighbor allocation solutions of the current allocation solution Y;
   step 2.6: calculating the coverage opportunity set selected under each neighbor allocation solution, better coverage mode set and corresponding completion time separately, and selecting the neighbor allocation solution with minimum completion time as the optimal neighbor allocation solution $\overline{Y}^*$;

step 2.7: comparing the completion time of the optimal neighbor allocation solution $\overline{Y}^*$ with the completion time of the current allocation solution Y; if F($\overline{Y}^*$)≤F(Y), assigning the optimal neighbor allocation solution $\overline{Y}^*$ to the current allocation solution Y, and then carrying out step 2.8 directly; otherwise, carrying out step 2.8 after the step 2.7.1-step 2.7.2;

step 2.7.1: calculating an inferior solution accept rate $$P_k = \exp\left\{\frac{F(Y) - F(\overline{Y}^*)}{T_k}\right\}$$

$k^{th}$ iteration;

step 2.7.2: generating a random number $r_k$ of 0-1 at $k^{th}$ times; if $r_k \leq p_k$, assigning the optimal neighbor allocation solution $\overline{Y}^*$ to the current allocation solution Y;

step 2.8: assigning k+1 to k, and updating the annealing temperature $T_k = T_{k-1} \times \lambda$, wherein $\lambda$ is a cooling coefficient and is a fixed value less than 1 and greater than 0; and then carrying out step 2.4;

step 2.9: outputting the current allocation solution Y as well as the overall selected coverage opportunity set S*(Y) under the allocation solution, better coverage modes C*(Y) of each coverage opportunity and corresponding completion time F(Y).

2. The partition satellite mission planning method according to claim 1, wherein the step 1 is carried out as follows:

step 1.1: setting length $L_p$ and width $W_p$ of each subregion;

step 1.2: calculating the length $L_R$ and width $W_R$ of the to-be-observed rectangular region R according to the coordinates of four vertexes of the to-be-observed rectangular region R;

step 1.3: dividing $L_p$ by $L_R$ to obtain length section number $D_L$ and remainder $R_L$ of the subregion; if the remainder $$R_L \geq \frac{D_L}{2D_L + 1} L_p,$$

assigning $D_L+1$ to $D_L$; dividing $W_p$ by $W_R$ to obtain width section number $D_W$ and remainder $R_W$ of the subregion, and if the remainder $$R_W \geq \frac{D_W}{2D_W + 1} W_p,$$

assigning $D_W+1$ to $D_W$;

step 1.4: dividing $L_R$ by $D_L$ to obtain length $L_f$ of the final subregion, and dividing $W_R$ by $D_W$ to obtain width $W_f$ of the final subregion;

step 1.5: according to the length $L_f$ and width $W_f$ of the final subregion, equally partitioning the to-be-observed rectangular region R, thereby obtaining the coordinates of four vertexes of each subregion, comprising:

step 1.5.1: if i=1, using the left upper corner coordinate LU(R) of the to-be-observed rectangular region R as the left upper corner coordinate LU($n_i$) of the $i^{th}$ subregion $n_i$;

step 1.5.2: adding an abscissa value of the left upper corner coordinate LU($n_i$) of the $i^{th}$ subregion $n_i$, and $L_f$ to obtain the right upper corner coordinate RU($n_i$) thereof; adding an ordinate value of the left upper corner coordinate LU($n_i$) and $W_f$ to obtain the left lower corner coordinate LD($n_i$) thereof; and adding the ordinate value of the right upper corner coordinate RU($n_i$) and $W_f$ to obtain the right lower coordinate RD($n_i$);

step 1.5.3: if the right lower corner coordinate RD($n_i$) of the $i^{th}$ subregion $n_i$ is equal to the right lower corner coordinate RD(R) of the to-be-observed rectangular region R, carrying out step 1.5.6; otherwise, carrying out step 1.5.4;

step 1.5.4: if the abscissa value of the right upper corner coordinate RU($n_i$) of the $i^{th}$ subregion $n_i$ is equal to the abscissa value of the right upper corner coordinate RU(R) of the to-be-observed rectangular region R, using LD($n_{(i-D_L+1)}$) as the left upper corner coordinate LU($n_{i+1}$) of the $(i+1)^{th}$ subregion $n_{i+1}$; otherwise, using the right upper corner coordinate RU($n_i$) of the $i^{th}$ subregion $n_i$ as the left upper corner coordinate LU($n_{i+1}$) of the $(i+1)^{th}$ subregion $n_{i+1}$;

step 1.5.5: after i+1 is assigned to i, carrying out step 1.5.2 to construct the coordinates of four vertexes of a next subregion;

step 1.5.6: ending the partitioning, and outputting the coordinates of four vertexes of each subregion;

step 1.6: obtaining a set N of the subregions, and the total number of the subregions of $|N|=D_L \times D_W$.

3. The partition satellite mission planning method according to claim 1, wherein the step 2.5 is carried out as follows:

step 2.5.1: setting the number of the to-be-constructed neighbor allocation solutions as $\overline{m}$, and setting the number of the constructed neighbor allocation solutions as m, and m=0;

step 2.5.2: using the insert operator to construct the neighbor allocation solution, comprising step 2.5.2.1-step 2.5.2.4:

step 2.5.2.1: finding an idle coverage opportunity $\hat{s}$ from an unselected coverage opportunity set S'(Y)={S/S*(Y)} under the current allocation solution Y, wherein the end time $\beta(\hat{s})$ of the idle coverage opportunity $\hat{s}$ is smaller than the overall completion time F(Y) but greater than the completion time $F_{y_{\hat{s}}}(Y)$ that the idle coverage opportunity $\hat{s}$ is allocated to the subregion $y_{\hat{s}}$; if the idle coverage opportunity is not found, carrying out step 2.5.2.4; otherwise, carrying out step 2.5.2.2;

step 2.5.2.2: assigning m+1 to m, and randomly allocating the idle coverage opportunity $\hat{s}$ in the current allocation solutions Y to one subregion, wherein the end time $\beta(\hat{s})$ of the idle coverage opportunity $\hat{s}$ is smaller than the completion time of the allocated subregion, thereby forming a neighbor allocation solution $\overline{Y}_m$;

step 2.5.2.3: removing the idle coverage opportunity s from the coverage opportunity set S'(Y), and then carrying out step 2.5.2.1;

step 2.5.2.4: outputting all neighbor allocation solutions obtained by utilizing the insert operator;

step 2.5.3: using the exchange operator to construct the neighbor allocation solution, comprising step 2.5.3.1-step 2.5.3.3:

step 2.5.3.1: if m≥$\overline{m}$, carrying out step 2.5.3.3; otherwise, carrying out step 2.5.3.2;

step 2.5.3.2: assigning m+1 to m; randomly selecting two subregions $n_i$ and $n_j$ from the subregion set N; randomly selecting one coverage opportunity $s_i$ from the coverage opportunity set {s|$y_s$=$n_i$} allocated to the subregion $n_i$; randomly selecting one coverage opportunity $s_j$ from the coverage opportunity set {s|$y_s$=$n_j$} allocated to the subregion $n_j$; exchanging $s_i$ and $s_j$ in the current allocation solution Y, that is, assigning $n_j$ to $y_{s_j}$, and assigning $n_i$ to $y_{s_i}$, thereby forming a neighbor coverage solution $\overline{Y}_m$, and then carrying out step 2.5.3.1;

step 2.5.3.3: outputting all neighbor allocation solutions obtained by using the exchange operator.

4. The partition satellite mission planning method according to claim 1, wherein the step 2.2 and the step 2.6 of calculating the selected coverage opportunity set under the given allocation solution, a better coverage mode set selected for each coverage opportunity and corresponding completion time are carried out as follows:

step a: using different subregions and the set of coverage opportunities allocated to different subregions as inputs to construct grids, and using a two-phase heuristic algorithm to calculate the coverage opportunity set selected for local part of different subregions as well as the better coverage solution and corresponding completion time;

step a.1: dividing the $i^{th}$ subregion $n_i$ into a plurality of consistent square grids to obtain a grid set $J_i$;

step a.2: according to the divided grid set $J_i$, generating a longest basic coverage mode for the coverage opportunity set $S_i$ allocated to the $i^{th}$ subregion $n_i$, and forming an optional coverage mode set $C_i$, wherein the longest basic coverage mode refers to that the length is equal to the maximum length $r_s$, and the following two types of grids exist:
  (1) one type of grids is completely covered by the coverage mode, that is, the four vertexes are within the area covered by the coverage mode;
  (2) one grid has a vertex located on a left border of the coverage mode and is named left grid, and the other grid has a vertex located on an upper border of the coverage mode and is named upper grid, wherein the left grid and the upper grid is overlapped;

step a.3: by utilizing the grid set $J_i$ separated from $i^{th}$ subregion $n_i$ as well as the coverage opportunity set $S_i=\{s|y_s=n_i, s\in S\}$ allocated to $i^{th}$ subregion $n_i$ and the optional coverage mode set $C_i$ as inputs, determining the coverage opportunity subset $S_i^*$ selected by the $i^{th}$ subregion $n_i$ by the two-phase heuristic algorithm, and selecting the coverage mode of each coverage opportunity, in order to obtain the better coverage mode set $C_i^*$ and the completion time $F_i$ thereof;

step b: combining the coverage opportunity sets $\{S_i^*|i=1, 2, \ldots, |N|\}$ selected by all subregions to obtain an overall selected coverage opportunity set $S^*$; combining the coverage solutions $\{C_i^*|i=1, 2, \ldots, |N|\}$ of all subregions to obtain an overall coverage solution $C^*$ of the to-be-observed rectangular region R; and using the maximum value of the completion time $\{F_i^*|i=1, 2, \ldots, |N|\}$ corresponding to the coverage solutions of all subregions as the overall completion time F of the to-be-observed rectangular region R.

5. The partition satellite mission planning method according to claim 4, wherein the step a.2 of generating a longest basic coverage mode for the coverage opportunity set according to the grid set and forming the optional coverage mode set is carried out as follows:

step a.2.1: if $S_i=\emptyset$, carrying out step a.2.4; otherwise, carrying out step a.2.2;

step a.2.2: selecting one of coverage opportunities $s \in S_i$ and according to the type of the coverage opportunity s, using methods in step a.2.2.1 to step a.2.2.10 to construct a longest basic coverage mode set $C_s$ based on the grid set $J_i$ for the coverage opportunity s;

step a.2.2.1: judging the type of the coverage opportunity s according to a sub-satellite point track $o_s$ of the coverage opportunity s, and the types including a right lower corner oblique type and a left lower corner oblique type;

step a.2.2.2: making the longest basic coverage mode set as $C_s=\emptyset$;

step a.2.2.3: selecting subsets $J_s$ from the grid set $J_i$, and using each grid in the subsets $J_s$ as the left grid of the longest basic coverage mode of the coverage opportunity s;

step a.2.2.3.1: setting $J_s=\emptyset$;

step a.2.2.3.2: traversing the set $J_i$, and calculating a camera roll angle $$\sigma_s(u) = \arctan\frac{d_s^u}{h_s} - \frac{w_s}{2}$$

of the coverage opportunity S when each grid u is used as the left grid of the coverage mode, wherein if the coverage opportunity is the left lower corner oblique type, $d_s^u$ is a distance between the left lower corner vertex LD(u) of the grid u and the sub-satellite point track $o_s$ of the coverage opportunity s; if the coverage opportunity is the left lower corner oblique type, $d_s^u$ is a distance between the left upper corner vertex LU(u) of the grid u and the sub-satellite point track $o_s$ of the coverage opportunity s; if $|\sigma_s(u)| \leq v_s$, adding the grid u into the subset $J_s$ of the left grid;

step a.2.2.4: if $J_s=\emptyset$, carrying out step a.2.2.10; otherwise, after one grid P in $J_s$ is selected, carrying out step 2.2.1.2.2.5;

step a.2.2.5: according to the grid p, selecting the grid subset $J_s^p$ from the grid set $J_i$, and when p is used as the left grid, using each grid in $J_s^p$ as the upper grid to form a longest basic coverage mode of the coverage opportunity s together with p;

step a.2.2.6: if $J_s^p=\emptyset$, carrying out step a.2.2.9; otherwise, after one grid q in $J_s^p$ is selected, carrying out step a.2.2.7;

step a.2.2.7: based on the grids p and q, constructing the longest basic coverage $c_s(p,q)$ belonging to the coverage opportunity s;

step a.2.2.8: adding $c_s(p,q)$ into $C_s$, removing the grid q from $J_s^p$, and then carrying out step a.2.2.6;

step a.2.2.9: removing the grid p from $J_s$, and then carrying out step a.2.2.4;

step a.2.2.10: outputting the coverage mode set $C_s$;

step a.2.3: removing the coverage mode opportunity s from $S_i$, and then carrying out step a.2.1;

step a.2.4: if $C_i\{c_s|\forall c_s \in C_s, \forall s \in S_i\}$, outputting the coverage mode set $C_i$.

6. The partition satellite mission planning method according to claim 5, wherein the step a.2.2.5 is carried out as follows:

step a.2.2.5.1: setting $J_s^p=\emptyset$;

step a.2.2.5.2: calculating a strip width $n_s(p)$ of the coverage mode when the grid p is used as the left grid by using the formula (1):

$$\eta_s(p) = \begin{cases} d_s^p - h_s \cdot \tan\left(\arctan\frac{d_s^p}{h_s} - w_s\right), & \arctan\frac{d_s^p}{h_s} > w_s \\ d_s^p + h_s \cdot \tan\left(w_s - \arctan\frac{d_s^p}{h_s} - w_s\right), & \arctan\frac{d_s^p}{h_s} \leq w_s \end{cases} \quad (1)$$

step a.2.2.5.3: traversing the set $J_i$; checking whether one grid t satisfies the following four conditions; if all conditions are satisfied, adding the grid t into $J_s^p$; otherwise, checking the next grid;

if the coverage opportunity is the right lower corner oblique type, the four conditions are:
(1) making the straight line $L_p \| o_s$ through the left lower corner vertex of the grid p, making the straight line $L_t' \| o_s$ through the right upper corner vertex of t, and ensuring that the distance between the straight lines $L_p$ and $L_t'$ do not exceed the width $\eta_s(p)$ of the strip;
(2) making the straight lines $L_p' \perp s$ and $L_t \perp o_s$ respectively through the left upper corner vertexes of the grids p and t, and enabling $L_t$ to be above $L_p'$;
(3) making the straight line $\overline{L_p} \| o_s$ through the left lower corner vertex of the grid t, and enabling the straight line $\overline{L_t}$ to be at the right side of $L_p$;
(4) making the straight line $\overline{L_p} \perp o_s$ through the right lower corner vertex of the grid p, and ensuring that the distance between the straight lines $\overline{L_p}$ and $L_t$ do not exceed the length $l_s$ of the strip, wherein "$\|$" indicates a parallel relation, and "$\perp$" indicates a vertical relation;

if the coverage opportunity is the left lower corner oblique type, the four conditions are:
(1) making the straight line $L_p \| o_s$ through the left upper corner vertex of the grid p, making the straight line $L_t' \| o_s$ through the right upper corner vertex of t, and ensuring that the distance between the straight lines $L_p$ and $L_t'$ do not exceed the width $\eta_s(p)$ of the strip;
(2) making the straight lines $L_p' \perp o_s$ and $L_t \perp o_s$ respectively through the right upper corner vertexes of the grids p and t, and enabling $L_t$ to be above $L_p'$;
(3) making the straight line $\overline{L_p} \| o_s$ through the left upper corner vertex of the grid t, and enabling the straight line $\overline{L_t}$ to be at the right side of $L_p$;
(4) making the straight line $\overline{L_p} \perp o_s$ through the left lower corner vertex of the grid p, and ensuring that the distance between the straight lines $\overline{L_p}$ and $L_t$ do not exceed the length $l_s$ of the strip, wherein "$\|$" indicates a parallel relation, and "$\perp$" indicates a vertical relation.

7. The partition satellite mission planning method according to claim 5, wherein the step a.2.2.7 is carried out as follows:
step a.2.2.7.1: if the coverage opportunity is the right lower corner oblique type, making the straight line $L_p \| o_s$ through the left lower corner vertex LD(p) of the grid p, and making the straight line $L_q \perp o_s$ through the left upper corner vertex LU(q) of the grid q; if the coverage opportunity is the left lower corner oblique type, making the straight line $L_p \| o_s$ is made through the left upper corner vertex LU(p) of the grid p, and making the straight line $L_q \perp o_s$ through the right upper corner vertex RU(q) of the grid q;
step a.2.2.7.2: calculating the strip width $\eta_s(p)$ of the coverage mode when the grid p is used as the left grid;
step a.2.2.7.3: making the straight line $\overline{L_p}$ in order to satisfy:
(1) $\overline{L_p} \| L_p$;
(2) the distance between $\overline{L_p}$ and $L_p$ is equal to $\eta_s(p)$;
(3) $\overline{L_p}$ is at the right side of $L_p$;
step a.2.2.7.4: making the straight line $\overline{L_q}$ in order to satisfy:
(1) $\overline{L_q} \| L_q$;
(2) the distance between $\overline{L_q}$ and $L_q$ is equal to $l_s$;
(3) $\overline{L_q}$ is at the lower side of $L_q$;

step a.2.2.7.5: using four straight lines of $L_p, \overline{L_p}, L_q, \overline{L_q}$ as four sides of the rectangle, and using intersections of the four straight lines as four vertexes of the rectangle to construct the coverage mode $c_s(p,q)$.

8. The partition satellite mission planning method according to claim 4, wherein the step a.3 is carried out as follows:
step a.3.1: by utilizing the grid set $J_i$, the coverage opportunity set $S_i$ and the corresponding coverage mode set $C_i$ as inputs, calculating the selected coverage opportunity subsets $S_i^*$, the selected coverage mode sets $C_i^*$ and the number $A_i$ of corresponding coverable grids with the heuristic algorithm;
step a.3.2: if $A_i < |J_i|$, with $|J_i|$ indicating the number of elements in the set carrying out step a.3.4; otherwise, carrying out step a.3.3;
step a.3.3: optimizing $S_i^*$ and $C_i^*$ by using a promotion algorithm;
step a.3.3.1: removing one coverage opportunity $$s_m = \arg\max_{\forall s \in S_i^*} \beta(s)$$

with maximum end time in $S_i^*$ from $S_i^*$ to obtain the coverage opportunity set $\overline{S_i}$;
step a.3.3.2: by utilizing the grid set $J_i$, the coverage opportunity set $\overline{S_i}$ and the optional coverage mode set $\overline{C_i} = \{c | \forall c \in C_s, \forall s \in \overline{S_i}\}$ corresponding to $\overline{S_i}$ as inputs, calculating the selected coverage opportunity subsets $\overline{S_i}^*$, the selected coverage mode set $\overline{C_i}^*$ and the number $\overline{A_i}$ of the corresponding coverable grids with the heuristic algorithm;
step a.3.3.3: if $\overline{A_i} = |J_i|$, assigning $\overline{S_i}^*$ to $S_i^*$, and assigning $\overline{C_i}^*$ to $C_i^*$; carrying out step a.3.3.1; otherwise, carrying out step a.3.4;
step a.3.4: outputting the selected coverage opportunity set $S_i^*$ and the coverage mode set $C_i^*$; and using the maximum value of the end time of the coverage opportunity in $S_i^*$ as the completion time $F_i$.

9. The partition satellite mission planning method according to claim 8, wherein the step a.3.1 is carried out as follows:
step a.3.1.1: sorting all coverage opportunities in $S_i$ in a non-descending order according to the end time to obtain $$\vec{S_i} = \{s_1, s_2, \ldots, s_{|\vec{S_i}|}\};$$

step a.3.1.2: setting the state of all grids in $J_i$ as "uncovered"; g=0, wherein g indicates the subscript of the $g^{th}$ coverage mode in the coverage mode set $C_i^*$; $C_i^* = \emptyset$;
step a.3.1.3: assigning g+1 to g; extracting the coverage opportunity $s_g$ from $\vec{S_i}$; traversing the optional coverage mode set $C_{s_g}$; for each coverage mode $c_{s_g}$, selecting the grid capable of being completely covered by $c_{s_g}$ and with the state of "uncovered" from the grid set $J_i$ and marking as valid grid sets $V(c_{s_g})$, and marking the number as $|V(c_{s_g})|$;
step a.3.1.4: selecting the coverage mode $$c_{s_g}^* = \arg\max_{\forall c_{s_g} \in C_{s_g}} |V(c_{s_g})|$$

covering the most valid grids from $C_{s_g}$ to serve as the coverage mode selected by the coverage opportunity $s_g$; after $c_{s_g}^*$ is added into $C_i^*$, changing the state of all grids in the valid grid sets $V(c_{s_g})$ of the coverage mode $c_{s_g}^*$ as "covered";

step a.3.1.5: calculating the number of all grids with the state of "covered" in $J_i$ and marking as $A_i$;

step a.3.1.6: if $A_i=|J_i|$ or $g=|S_i|$, carrying out step a.3.1.7; otherwise, carrying out step a.3.1.3;

step a.3.1.7: outputting the coverage opportunity subset $S_i^*=\{s_1, s_2, \ldots, s_g\}$ as well as the coverage mode set $C_i^*$ thereof and the number $A_i$ of covered grids.

10. The partition satellite mission planning method according to claim 8, wherein the step a.3.3.2 is carried out as follows:

step a.3.3.2.1: setting the state of all grids in $J_i$ as "uncovered", and $\overline{C_i^*}=\emptyset$;

step a.3.3.2.2: $\overline{g}=1$, wherein $\overline{g}$ indicates the subscript of the $\overline{g}^{th}$ coverage mode in the coverage mode set $\overline{C_i^*}$;

step a.3.3.2.3: if $\overline{g}>|\overline{C_i}|$, carrying out step a.3.3.2.5; otherwise, carrying out step a.3.3.2.4;

step a.3.3.2.4: selecting the $\overline{g}^{th}$ coverage mode in $\overline{C_i}$, and selecting the grids capable of being completely covered by the $\overline{g}^{th}$ coverage mode and with the state of "uncovered" from the grid set $J_i$ and marking as valid grid set $V(\overline{g})$, and marking the number as $|V(\overline{g})|$; assigning $\overline{g}+1$ to $\overline{g}$; and carrying out step a.3.3.2.3;

step a.3.3.2.5: if $\overline{C_i}=\emptyset$, carrying out step a.3.3.2.8; otherwise, carrying out step a.3.3.2.6;

step a.3.3.2.6: selecting the coverage mode $$\overline{g}^* = \arg\max_{\forall \overline{g} \in \overline{C_i}} \left| V(\overline{g}) \right|$$

with most valid grids in $C_i$ to serve as the coverage mode selected by the corresponding coverage opportunity $\overline{s}^*$; adding $\overline{g}^*$ into $\overline{C_i^*}$, and changing the state of all grids in the valid grid set $V(\overline{g}^*)$ of the coverage mode $\overline{g}^*$ to be "covered";

step a.3.3.2.7: removing the coverage mode set $C_{\overline{s}^*}$ corresponding to the coverage opportunity $\overline{s}^*$ from the optional coverage mode set $\overline{C_i}$, and then carrying out step a.3.3.2.2;

step a.3.3.2.8: outputting the coverage mode set $\overline{C_i^*}$ selected by each coverage opportunity, that is the final coverage solution; and calculating the number of all "covered" grids in $J_i$ and marking as $\overline{A_i}$.

* * * * *